United States Patent
Archacki, Jr. et al.

(10) Patent No.: US 6,634,566 B2
(45) Date of Patent: Oct. 21, 2003

(54) ADVANCED SETBACK REPORTING THERMOSTAT

(75) Inventors: Raymond J. Archacki, Jr., Wethersfield, CT (US); Jerry L. Proffitt, Wabash, IN (US)

(73) Assignee: Carrier Corporation, Syracuse, NY (US)

(*) Notice: Subject to any disclaimer, the term of this patent is extended or adjusted under 35 U.S.C. 154(b) by 0 days.

(21) Appl. No.: 10/004,684

(22) Filed: Feb. 12, 2002

(65) Prior Publication Data

US 2003/0150925 A1 Aug. 14, 2003

(51) Int. Cl.$^7$ .............................. F23N 5/20; G05D 23/00
(52) U.S. Cl. ..................... 236/46 R; 236/94; 165/238
(58) Field of Search .......................... 236/46 R, 47, 236/94; 165/238, 267, 11.1

(56) References Cited

U.S. PATENT DOCUMENTS

| 4,318,276 A | * 3/1982 | Sato et al. ............... 236/94 X |
|---|---|---|
| 4,401,262 A | 8/1983 | Adams et al. ............. 236/47 |
| 5,197,668 A | 3/1993 | Ratz et al. ................ 236/51 |
| 5,318,224 A | 6/1994 | Darby et al. .............. 236/47 |
| 5,361,982 A | 11/1994 | Liebl et al. ............... 236/47 |
| 5,462,225 A | 10/1995 | Massara et al. ........... 236/47 |
| 5,819,840 A | 10/1998 | Wilson et al. ............ 165/11.1 |
| 5,926,776 A | 7/1999 | Glorioso et al. .......... 702/130 |
| 6,254,009 B1 | * 7/2001 | Proffitt et al. ............. 236/47 |
| 6,264,110 B1 | * 7/2001 | Proffitt et al. ........... 236/46 R |
| 6,305,611 B1 | 10/2001 | Proffitt et al. ............. 236/47 |

\* cited by examiner

Primary Examiner—William Wayner
(74) Attorney, Agent, or Firm—William F. White

(57) ABSTRACT

A thermostat is operative to note the current temperature at time of entering into a setback of one or more previously established setpoints. The thermostat is also operative to note any newly defined setpoints. The thermostat also notes whether the setback is to occur in a heating or cooling mode of operation. The thermostat maintains a record of the aforementioned entry conditions mount of time the thermostat participates in a requested setback. The thermostat also preferably notes one or more setpoints and sensed temperature occurring at the end of an implemented setback as well as the ending heating or cooling mode of operation. A record of temperature conditions, mode of operation and elapsed time for each setback is stored for retrieval by a remotely located entity in communication with the thermostat. The entity is usually an energy provider. This record is available for retrieval at any time, including a time when the thermostat is presently implementing a setback.

24 Claims, 5 Drawing Sheets

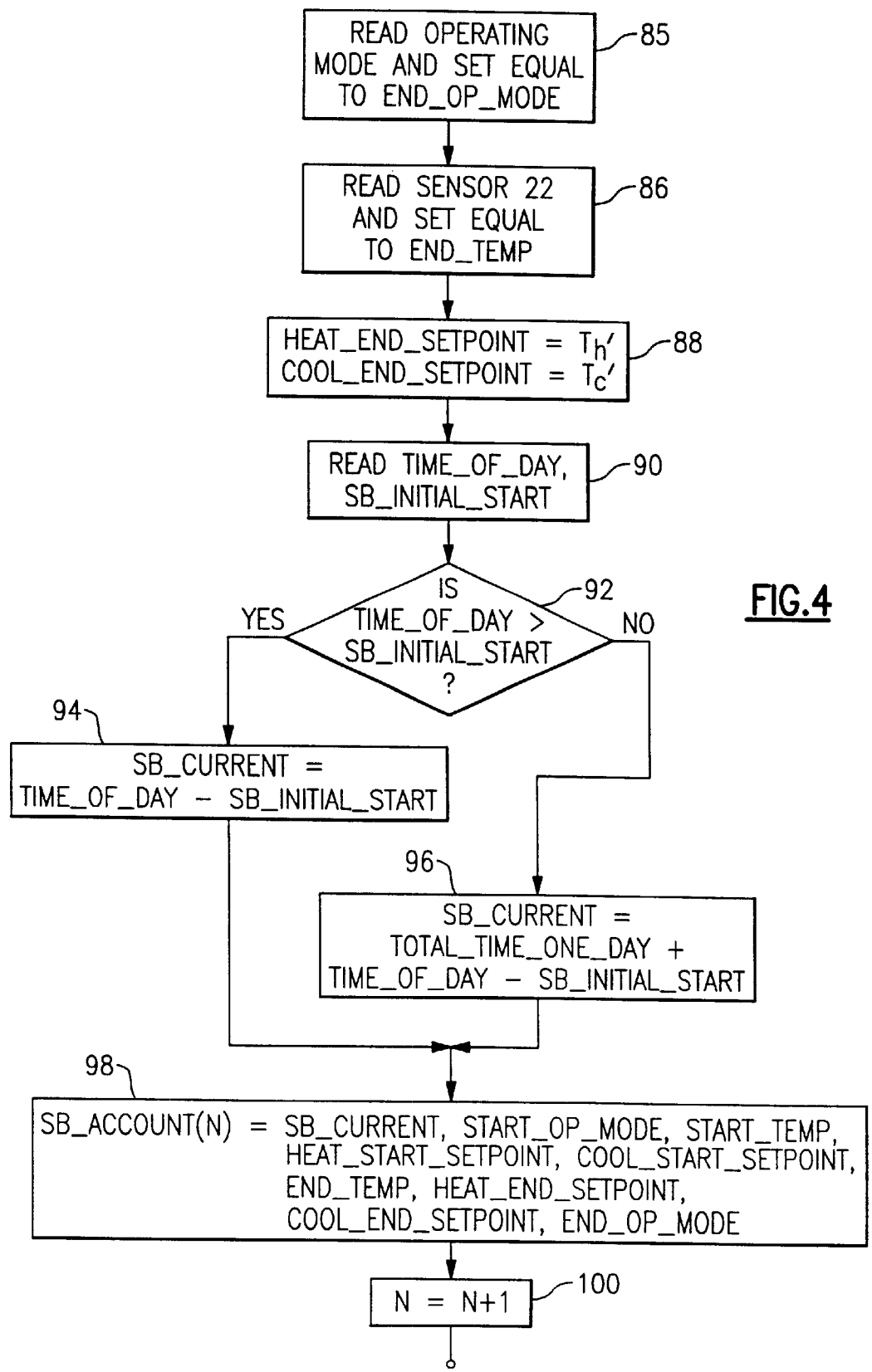

ADVANCED SETBACK REPORTING THERMOSTAT

BACKGROUND OF THE INVENTION

The present invention relates to thermostats having the capability of tracking, recording, and reporting setback information to a remotely located entity.

Thermostats have heretofore received and implemented setbacks of locally entered setpoints in response to receiving setback information from a remotely located source such as an energy provider. Examples of such thermostats are disclosed in commonly assigned U.S. Pat. No. 6,264,110 entitled "Setback Reporting Thermostat" and commonly assigned U.S. Pat. No. 6,305,611 entitled "Setback Tracking Thermostat". The aforementioned thermostats include the ability within the thermostats to maintain an accurate record of the amount of time that the thermostat participates in one or more setbacks of locally entered setpoints. This record is transmitted to an energy provider upon request.

The above described thermostats do not however necessarily provide the energy provider with a complete record as to what has occurred during the one or more setbacks implemented by these thermostats. In this regard, these thermostats only provide the amount of time spent in the one or more setbacks of locally entered setpoints. This reported information does not include a record of the actual temperature conditions occurring during the one or more setbacks implemented by these thermostats.

SUMMARY OF THE INVENTION

A thermostat is operative to note the current temperature at time of entering into a setback of one or more previously established setpoints. The thermostat is also operative to note any newly defined setpoints. The thermostat also preferably notes whether a setback is to occur in a heating or cooling mode of operation. The thermostat maintains a record of the aforementioned entry conditions as well as the amount of time the thermostat participates in a requested setback. The thermostat also preferably notes one or more setpoints, operating mode and sensed temperature occurring at the end of an implemented setback. A setback record of temperature conditions, modes of operation and elapsed time for each setback is stored for retrieval by a remotely located entity in communication with the thermostat. This entity is usually an energy provider. This record is available for retrieval at any time, including a time when the thermostat is presently implementing a setback.

The thermostat also preferably allows the requester to either clear the record or simply read the record without clearing. In either case, the thermostat preferably continues to track any time and temperature conditions in any currently implemented setback.

BRIEF DESCRIPTION OF THE DRAWINGS

For a fuller understanding of the present invention, reference should now be made to the following detailed description taken in conjunction with the accompanying drawings, wherein:

FIG. 4 is a flowchart of a sub-routine within the program of FIGS. 3A, 3B and 3C.

DESCRIPTION OF THE PREFERRED EMBODIMENT

Figure 1:
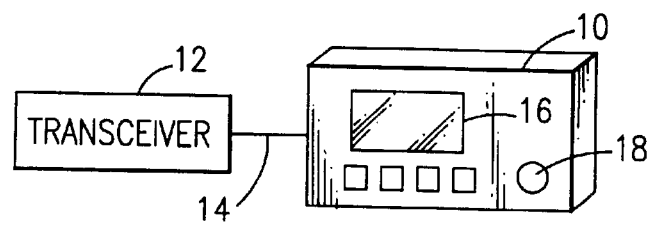
FIG. 1 is a block diagram of a thermostat and transceiver, wherein the transceiver is in communication with a remotely located device (not shown) so as to thereby receive and/or transmit information to the remotely located device.

Referring to FIG. 1, a thermostat 10 is operatively connected to a transceiver 12 via a communication line 14 so as to receive or transmit information to the transceiver 12. The transceiver 12 provides a communication link between the thermostat 10 and a remotely located device (not shown), which provides setpoint control information to the thermostat 10.

The remotely located device is preferably controlled by an energy provider seeking to provide cost effective setpoint control information to the thermostat 10.

The thermostat preferably causes messages to be displayed on a display 16 in response to receipt of information from the remotely located device. This includes the display of a message to the effect that the locally entered setpoint has been adjusted or altered in response to a request from the remotely located device. A touch sensitive button 18 on the front panel of the thermostat can be depressed any time one wishes to override the setback of the locally entered setpoint.

Figure 2:
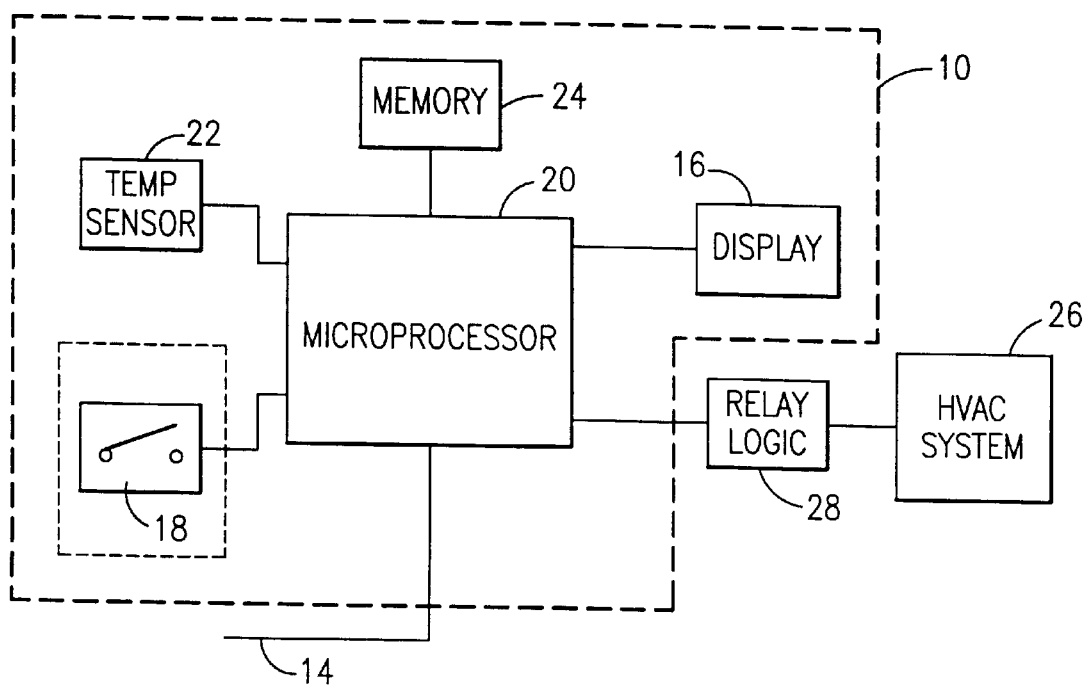
FIG. 2 is a block diagram of elements within the thermostat including a microprocessor that is responsive to signals from the transceiver.

Referring to FIG. 2, the touch-sensitive button 18 is illustrated as a switch connected to a microprocessor 20 which is in turn connected to the display 16. The microprocessor 20 is also connected to a temperature sensor 22 and a memory 24. The microprocessor normally executes one or more control programs stored in memory 24, which monitor any variation of the temperature indicated by the sensor 22 with respect to one or more locally entered setpoints preferably stored in the memory 24. These control programs cause the microprocessor to control an HVAC system 26 through relay logic 28 so as to thereby heat or cool the space in which the thermostat is located as necessary.

The microprocessor 20 also executes a program stored in memory 24, which processes information received from the transceiver 12 via the line 14. This latter program, when executed by the microprocessor, will preferably implement adjustments to the locally entered setpoints that have been stored in the memory 24. The microprocessor will thereafter execute the one or more control programs stored in the memory 24 so as to monitor any variation of the temperature indicated by the temperature sensor 22 with respect to the now modified setpoints. The program will furthermore cause the microprocessor to track and maintain an accurate record of temperature conditions and amount of elapsed time occurring during any setback or curtailment of a locally entered setpoint. The program processor will moreover maintain records of temperature and elapsed times occurring in any past setbacks or curtailments of locally entered setpoints. These records of setback or curtailment of locally entered setpoints will be made available upon receipt of a request from the energy provider.

Figure 3A:
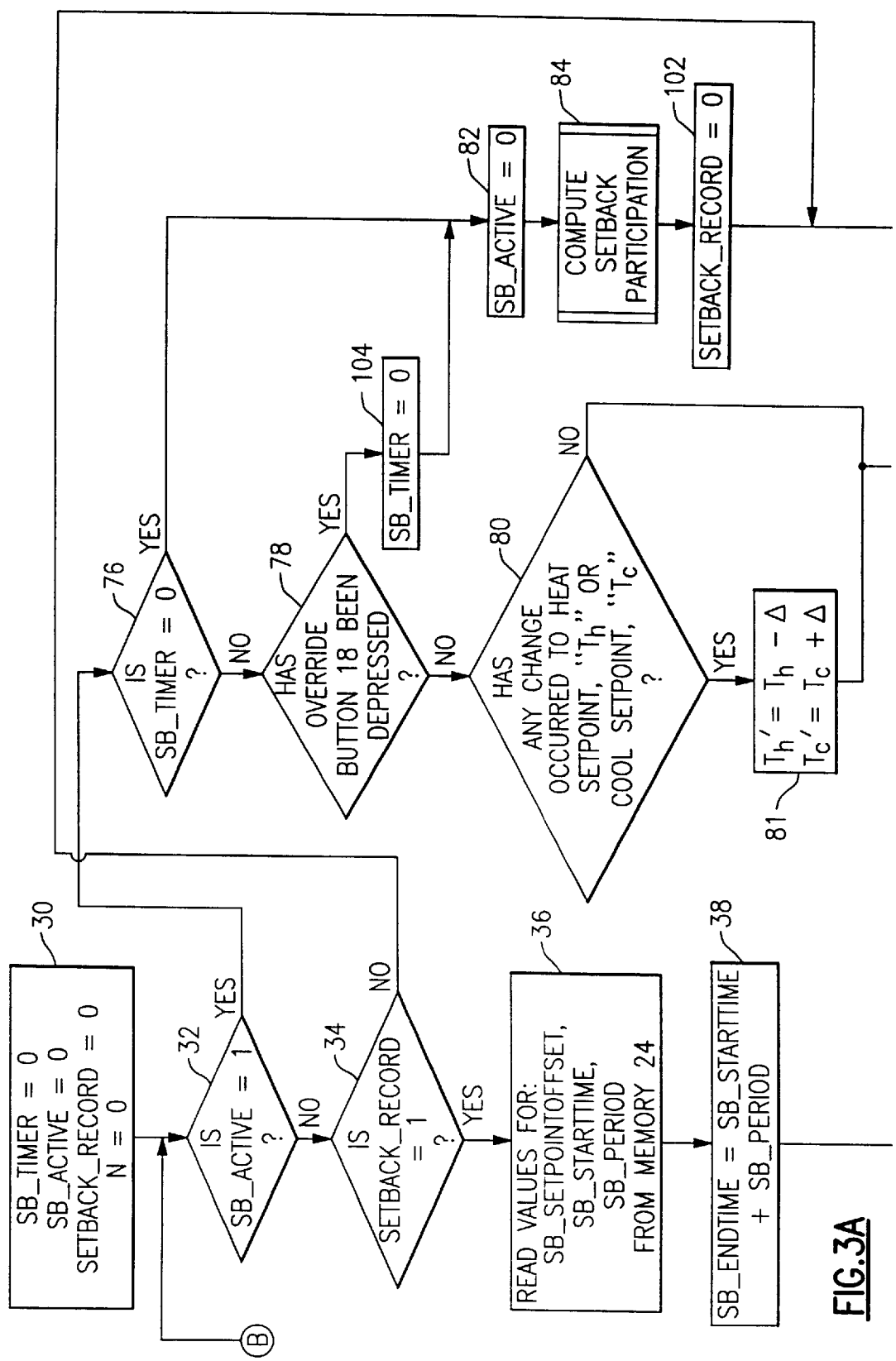
FIGS. 3A, 3B and 3C are a flowchart of the program implemented by the processor of FIG. 2 so as to respond to communications from the transceiver.
Figure 3B:
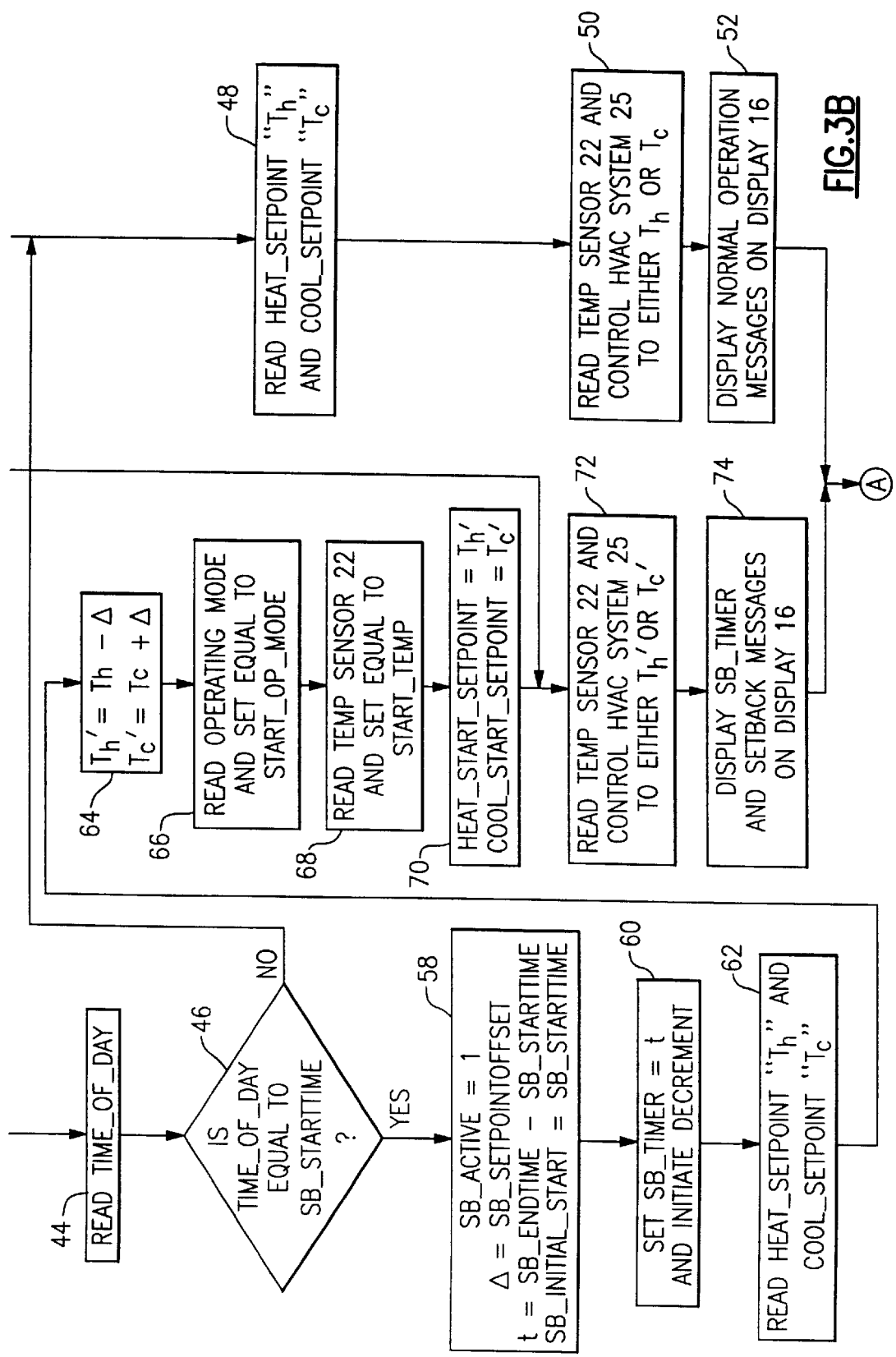
Figure 3C:
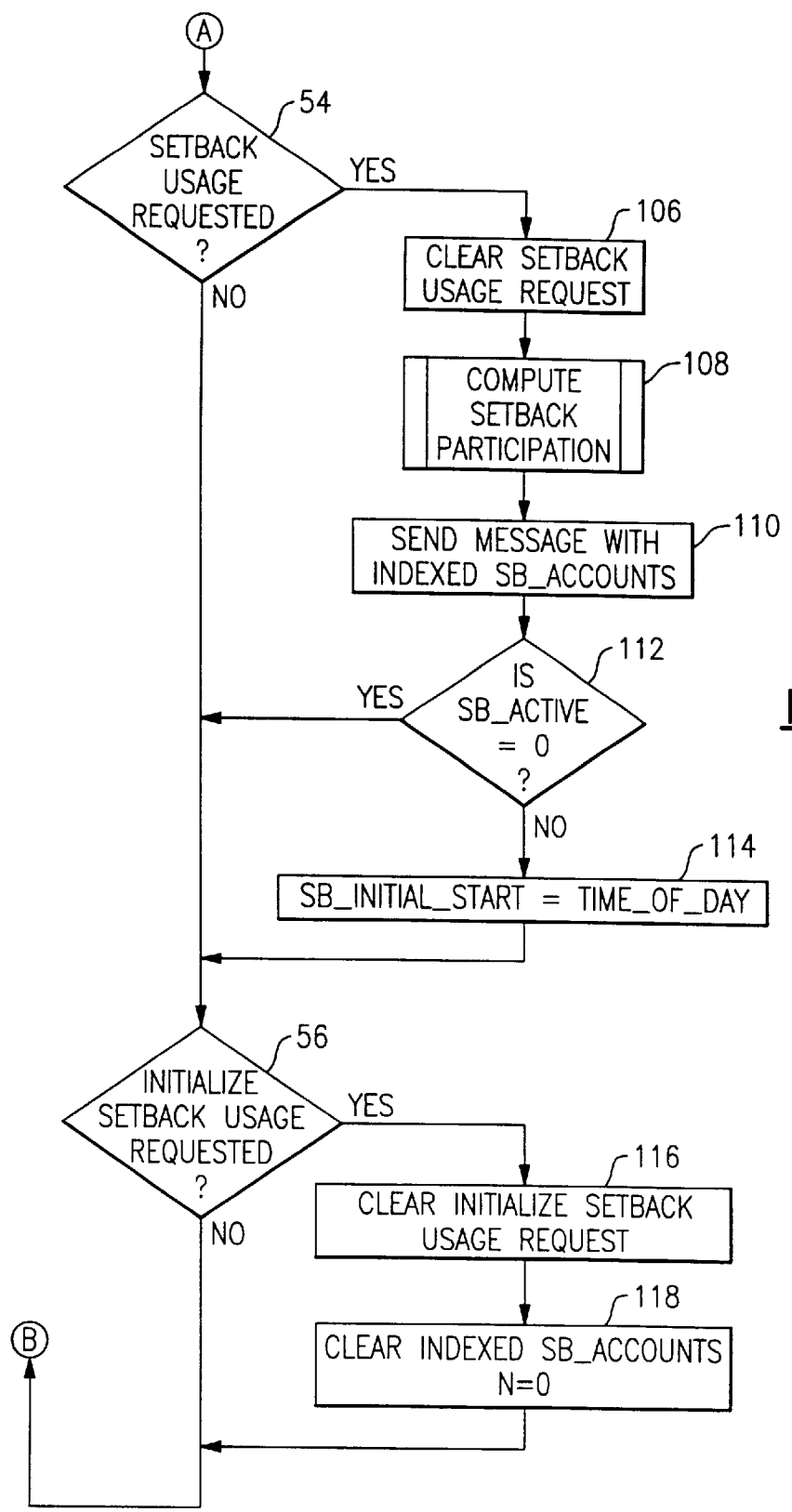

Referring to FIGS. 3A, 3B and 3C, a flowchart of the steps executed by the microprocessor 20 in response to receipt of information concerning setback or curtailment of locally entered setpoints is illustrated. As has been previously discussed, the microprocessor will receive this information from the transceiver 12 via the line 14. The flowchart begins with a step 30 wherein certain variables used by the program are initialized. These include SB_TIMER, SB_ACTIVE, SETBACK_RECORD and N. The microprocessor proceeds from a step 30 to a step 32 and inquires as to whether SB_ACTIVE is equal to one. Since this variable will have been initially set equal to zero, the microprocessor will proceed to a step 34 and inquire as to whether the SETBACK_RECORD equals one. It is to be appreciated that the microprocessor 20 will independently of the program illustrated in FIG. 3, respond to a communication passed along by the transceiver 12 regarding any setback of the setpoint that may be requested by the energy provider. SETBACK_RECORD will be set equal to one when this occurs. The processor will furthermore store information pertaining to the requested setback in the memory 24. This information will preferably include values for the following variables: SB_SETPOINTOFFSET, SB_STARTTIME, and SB_PERIOD. SB_SETPOINTOFFSET is the amount by which the locally setpoints are to be adjusted whereas SB_STARTTIME is the preferred time in which the setback of the setpoints is to begin. SB_PERIOD is the amount of time during which the particular setback is to occur. Assuming a setback request has been received and stored in the memory, the processor will proceed along a yes path to a step 36 and retrieve the values for SB_SETPOINTOFFSET, SB_STARTTIME and SB_PERIOD. The processor will proceed to a step 38 and compute the value of SB_ENDTIME, which is the sum of SB_STARTTIME plus SB_PERIOD.

The processor will proceed from step 38 to a step 44 and read the "TIME_OF_DAY". This is preferably read from an internal system clock within the microprocessor, which tracks time by at least the total number of minutes in a twenty-four hour day. The processor proceeds from step 44 to step 46 and inquires as to whether the TIME_OF_DAY read in step 44 is equal to SB_STARTTIME.

Assuming that the time of day is not equal to SB_STARTTIME, the processor will proceed along a no path out of step 46 to a step 48 and read the currently stored values of heat setpoint, $T_h$ and cool setpoint, $T_c$. The microprocessor will thereafter proceed to step 50 and read the temperature sensor 22 and thereafter control the HVAC system 26 to either $T_h$ or $T_c$.

It is to be appreciated that such control is defined by a separate control program, which reads the temperature sensor 22 and thereafter controls the HVAC system 26 so as to either achieve the heat setpoint $T_h$ or the cool setpoint $T_c$. It is to be appreciated that the setpoint which is used will depend on the operating mode of the HVAC system being controlled. If the operating mode of the HVAC system is, for example, heating, then $T_h$ will be used. On the other hand, if operating mode of the HVAC system is cooling, then $T_c$ is used. The processor will proceed to step 52 and display a message on the display 16 that the thermostat is in a "normal" mode of operation. The processor will proceed from step 52 through a junction A to a step 54 and inquire as to whether or not a request has been received for a report on setback usage by the thermostat. It is to be understood that such a request would normally be initiated by the energy provider and stored in the memory 24 for inquiry by the microprocessor in step 54. Assuming that no such setback usage has occurred, the processor will proceed along the no path to a step 56 and inquire as to whether a communication has been received from the energy provider requesting that setback usage be initialized. Assuming that such an initialization has not been requested, the processor will proceed along the no path to junction B and return to step 32.

Since the value of SB_ACTIVE is still zero, the processor will proceed through steps 34–46, as has been previously discussed. Assuming that the read time of day in step 44 now equals SB_STARTTIME, the processor will proceed along the yes path out of step 46 to a step 58. Referring to step 58, the processor will first set the variable SB_ACTIVE equal to one. The processor will also set a variable A equal to SB_SETPOINTOFFSET. The microprocessor will still furthermore compute the value of a variable "t" as being equal to SB_ENDTIME minus SB_STARTTIME. The processor may again need to account for any transition between one day and the next when doing this computation. In this regard, SB_ENDTIME would need to be adjusted by the total time in one day in the event that SB_STARTTIME is near the end of one day and SB_ENDTIME occurs the next day.

The final computation within step 58 is to set SB_INITIAL_START equal to SB_STARTTIME. The processor will proceed to step 60 and set a software timer SB_TIMER equal to "t" and initiate a decrementing of the software timer. The processor will next proceed from step 60 to a step 62 and read the locally entered setpoints $T_h$ and $T_c$ from memory 24. The processor will next proceed to a step 64 and adjust the values of $T_h$ and $T_c$ by the value of Δ. This will effectively lower the heat setpoint $T_h$ by the amount of Δ and raise the cool setpoint $T_c$ by the amount Δ. The processor will proceed to a step 66 and note the operating mode of the HVAC system being controlled as START_OP_MODE. The processor will proceed to read the temperature sensor 22 and store the read value as START_TEMP in a step 68. The processor will next proceed in a step 70 to store the values of $T'_h$ and $T'_c$ as HEAT_START_SETPOINT and COOL_START SETPOINT respectively. The processor will proceed to read the temperature sensor 22 and control the HVAC system 26 in accordance with either $T'_h$ or $T'_c$ as computed in step 72. In this manner, the HVAC control system will now be controlling the HVAC system to a lower heat setpoint or to a higher cool setpoint so as to thereby produce an incremental saving of energy costs. The processor will proceed to a step 74 and display the current value of SB_TIMER and a message indicating that the locally entered setpoint is being curtailed. The processor will proceed through steps 54 and 56 in the event that neither setback usage or an initialization of setback usage have been requested by the energy provider.

The processor will again return to step 32 and inquire as to whether SB_ACTIVE is equal to one. Since SB_ACTIVE will have been set equal to one in step 58, the processor will proceed along the yes path to a step 76 and inquire as to whether the software timer, SB_TIMER, has been decremented to zero. Assuming that the SB_TIMER is not equal to zero, the processor will proceed to a step 78 and inquire as to whether the override button 18 has been depressed. Assuming that the override button 18 has not been depressed, the processor will proceed to a step 80 and inquire as to whether the locally entered heat setpoint "$T_h$" or the locally entered cool setpoint "$T_c$" has changed between successive executions of the logic of FIG. 3. This is preferably accomplished by comparing the time of day with any user programmed setpoint change times in memory 24. If the time of day is within a very small predefined range of a programmed setpoint change time in memory 24, then the values of the new locally entered setpoints for the particular change time are read and stored as $T_h$ and $T_c$. The processor will then proceed to step 81 and adjust the new locally entered setpoints to $T'_h$ and $T'_c$.

The processor will proceed either from step 80 or step 81 to step 72 and implement the control of the HVAC system 26, as has been previously described. The display will be updated in accordance with step 74 before proceeding through steps 54 and 56 in the event that setback usage has not been requested.

Referring again to step 32, the processor will again inquire as to whether SB_ACTIVE is equal to one. Since the thermostat is implementing a setback, the processor will again proceed to step 76 and inquire as to whether the SB_TIMER equals zero. Assuming that SB_TIMER has now been decremented to zero, the processor will proceed along the yes path to a step 82 and set SB_ACTIVE equal to zero. The processor will proceed to a step 84 and initiate a sub-routine entitled "COMPUTE_SETBACK_PARTICIPATION". This particular sub-routine is illustrated in FIG. 4.

Referring to FIG. 4, the COMPUTE_SETBACK_PARTICIPATION sub-routine begins with a step 85 wherein the operating mode of the HVAC system being controlled is noted and stored as END_OP_MODE. The processor will then proceed with step 86 wherein the sensed temperature of the sensor 22 is read and set equal to END_TEMP. The processor proceeds to a step 88 to set $T'_h$ equal to HEAT_END_SETPOINT and $T'_c$ equal to COOL_END_SETPOINT. The processor will proceed to a step 90 wherein the current time of day is read as well as the value of the variables SB_INITIAL_START. It will be remembered that the value of $SB_{INITIAL}$_START will have been computed in step 58 to be equal to the TIME_OF_DAY read in step 44 when the thermostat enters a setback.

The processor proceeds from step 90 to a step 92 and inquires as to whether the currently read TIME_OF_DAY is greater than SB_INITIAL_START. In the event that the currently read TIME_OF_DAY is greater than SB_INITIAL_START, the processor will proceed along the yes path to a step 94 and compute the value of a variable denoted as SB_CURRENT. Referring to step 98, SB_CURRENT is equal to the TIME_OF_DAY as read in step 90 minus the value of SB_INITIAL_START. It is to be appreciated that this computation should yield the current amount of setback time that has expired since SB_ACTIVE was set equal to one in step 58. Referring again to step 92, in the event that the TIME_OF_DAY is not greater than SB_INITIAL_START, then the processor will proceed along the no path and compute the value of the SB_CURRENT variable in another manner. Specifically, SB_CURRENT will be equal to the value of TOTAL_TIME_ONE_DAY plus TIME_OF_DAY minus SB_INITIAL_START. In this regard, the value of the variable TOTAL_TIME_ONE_DAY is the total amount of time in a given day expressed in terms of total number of minutes in the day or whatever unit of time is used in the particular embodiment. It is to be appreciated that the computation of SB_CURRENT in step 96 is necessary in the event that a transition has occurred from one day to the next following the time indicated by SB_INITIAL_START.

Referring now to step 98, the values of SB_CURRENT, START_OP_MODE, START_TEMP, HEAT_START_TEMP, COOL_START_TEMP, END_OP_MODE, END_TEMP, HEAT_END_SETPOINT and COOL_END_SETPOINT are stored as a setback account record SB_ACCOUNT_RECORD(N). This account record essentially describes elapsed time and temperature conditions occurring during the particularly implemented setback, The processor proceeds to increment the setback account record index, N, by one in a step 100. The processor proceeds out of the sub-routine of FIG. 4 back to step 84 wherein the processor proceeds to a step 102 and sets SETBACK_RECORD equal to zero.

The processor proceeds from step 102 to step 48 wherein the locally programmed setpoints $T_h$ and $T_c$ are read before proceeding to step 50 to control the HVAC system in accordance with the appropriate locally entered setpoint $T_h$ or $T_c$. In this regard, the processor will now be using normal local unit setpoints to control the HVAC system. The processor will proceed through steps 52, 54, and 56, as has been previously described, before returning to step 32. Since SB_ACTIVE will have been previously set equal to zero in step 82, the processor will proceed along the no path out of step 32 to inquire as to whether SETBACK_RECORD equals one. If it does not, the microprocessor will proceed along the no path to step 48 and again execute steps 48–56, as has been previously described.

Referring again to step 34, in the event that SETBACK_RECORD is equal to one at some point, then the processor will again read the values of SB_SETPOINTOFFSET, SB_STARTTIME, and SB_PERIOD from the memory 24 in step 36. The processor will next proceed through steps 36–46 to determine whether the current TIME_OF_DAY is equal to SB_STARTTIME. Assuming that at some point TIME_OF_DAY is equal to SB_STARTTIME, the processor will proceed through steps 58–74 and hence through 54–56 as has been previously discussed. The processor will, on the next execution of the logic of FIG. 3, proceed back through step 32 and now exit along the yes path to step 76. Assuming that the SB_TIMER is not equal to zero, the processor will proceed to a step 78 and inquire whether the override button 18 has been depressed. It will be remembered that the override button 18 will have been depressed in the event that the user wishes to override the setback, as displayed on the display 16. If this occurs, the processor will proceed along the yes path out of step 78 and set SB_TIMER equal to zero in step 104. The processor will proceed to set SB_ACTIVE equal to zero in step 82 before proceeding in step 84 to the sub-routine for computing setback participation of FIG. 4.

Referring to FIG. 4, the operating mode of the HVAC system being controlled is stored as END_OP_MODE in step 85. The sensed temperature of the sensor 22 is read and set equal to END_TEMP in step 86. The processor proceeds to step 88 and sets $T'_h$ equal to HEAT_END_SETPOINT and $T'_c$ equal to COOL_END_SETPOINT. The current TIME_OF_DAY as well as the value of SB_INITIAL_START will be read in step 90. Inquiry will next be made as to whether the TIME_OF_DAY is greater than SB_INITIAL_START and the appropriate computation of SB_CURRENT will thereafter be made in either step 94 or 96. SB_CURRENT(N) will now be defined in step 98. The setback account record index, N, will be incremented by one in step 100. The processor will return to step 84 and thereafter proceed through steps 104 and 48–54. Assuming that a setback usage request has not been received in step 54, the processor will proceed through steps 54 and 56 and return to step 32, as has been previously discussed.

Referring again to step 32, it is to be appreciated that at some point in time during the successive executions of the logic of FIG. 3, another SETBACK_RECORD flag equal to one may occur. When this happens, SB_SETPOINTOFFSET and SB_STARTTIME and SB_PERIOD will again be read from the memory 24 in step 34. At some point the TIME_OF_DAY will again be equal to SB_STARTTIME. The processor will set SB_ACTIVE equal to one in step 58. The processor will proceed through steps 60, 62, 64, 66, 68, 70, 72 and 74, as has been previously described, before encountering step 54. Assuming that a setback usage request has been made and stored in the memory 24, the processor will proceed out of step 54 to step 106 and clear the thus stored setback usage request in memory 24. The processor will proceed to step 108 and implement the setback participation sub-routine of FIG. 4. As has been previously discussed, the operating mode of the HVAC system being controlled is stored as END_OP_MODE in step 85. The sensed temperature of the sensor 22 is read and set equal to END_TEMP in step 86. The processor proceeds to a step 88 to set $T'_h$ equal to HEAT_END_SETPOINT and $T'_c$ equal to COOL_END_SETPOINT. The TIME_OF_DAY will be read and compared with SB_INITIAL_START before computing the value of SB_CURRENT in either step 94 or 96. The processor will proceed in step 98 to define SB_CURRENT (N) in step 98. The setback account record index, N, will then be incremented by one in step 100 before returning to step 108. The processor will proceed from step 108 to step 110 wherein a message will be sent to the transceiver 12, which will in turn communicate with the energy provider's receiving device. The message will include the previously defined and indexed setback accounts. The processor will next proceed to step 112 and inquire as to whether SB_ACTIVE is equal to zero. It will be remembered that the request for setback usage was encountered during a time in which the setback was in effect. SB_ACTIVE would hence still be equal to one prompting the processor to proceed from step 112 to step 114. Referring to step 114, the variable SB_INITIAL_START will be set equal to the currently read time of day from the system clock. This will, essentially, set a new SB_INITIAL_START that is equal to the presently read TIME_OF_DAY. The processor will proceed from step 114 to step 56. Referring to step 56, it is to be noted that this step may also be encountered out of step 112. The processor will have proceeded out of step 112 to step 56 in the event that the thermostat was no longer implementing a setback as indicated by SB_ACTIVE being equal to zero. The processor will proceed to inquire in step 56 as to whether an initialization of setback usage request has been received and stored in the memory 24. This particular request will possibly be transmitted by the energy provider when the energy provider wishes to initialize the indexed setback account records. If such a request has been received, then the processor will proceed along the yes path to a step 116 and clear the initial setback usage request stored in memory 24. The processor will then proceed to step 118 and clear all indexed setback accounts and set the setback account record index, N, equal to zero. The processor will proceed from step 118 through junction B back to step 32. Referring again to step 56, in the event that a request to initialize the setback usage has not been received, the processor will proceed directly to step 32. It is thus to be appreciated that the processor may have sent a message to the energy provider in step 110 without initializing the indexed setback accounts if the processor has not received the initialized setback usage request. On the other hand, if the processor has received the initialized setback usage request, then the indexed setback accounts will be cleared in step 116 and the index N will be set equal to zero in step 118.

Referring again to step 32, inquiry is made as to whether SB_ACTIVE is equal to one. It is to be appreciated that SB_ACTIVE may either be one or zero after having processed a usage request through steps 106–118. Assuming that SB_ACTIVE is still equal to one, then the processor will proceed along the yes path to step 76 and inquire as to whether SB_TIMER equals zero. It will be remembered that SB_TIMER has been continually decrementing towards zero since having been initially set equal to "t" in step 60. This decrementing of the SB_TIMER will occur regardless of whether or not a setback usage request has been processed in steps 106–110. At some point, the SB_TIMER will be decremented to zero when step 76 is encountered. When this occurs, the processor will proceed along the yes path to step 82 and set SB_ACTIVE equal to zero before implementing the computation of setback participation in step 84. Referring to the sub-routine for computing setback computation in FIG. 4, the operating mode of the HVAC system being controlled will be stored as END_OP_MODE in step 85. The processor will again read the sensed temperature of the sensor 22 and store the value in END_TEMP in step 86. The processor proceeds to step 88 and sets $T'_h$ equal to HEAT_END_SETPOINT and $T'_c$ equal to COOL_END_SETPOINT. The processor proceeds to read the TIME_OF_DAY as well as the value of SB_INITIAL_START. It will be remembered that SB_INITIAL_START will have been set equal to the TIME_OF_DAY occurring when step 114 is executed. This will be a different SB_INITIAL_START than would have been normally carried by the processor as a result of implementing step 58. In other words, SB_INITIAL_START will now be whatever TIME_OF_DAY it was when the setback usage request was processed. The processor will proceed to inquire whether or not the read time of day in step 90 is greater than the value of SB_INITIAL_START in step 92. As has been previously discussed, SB_CURRENT will be computed out of step 92 in either step 94 or 96. SB_ACCOUNT(N) will now be defined in step 98. Referring to steps 106–118, it will be appreciated that the indexed setback accounts will either be whatever has been defined previously or these accounts will have been previously cleared in step 118. In this latter case, there will be no setback account records as a result of having received a message from the energy provider to initialize the setback usage out of step 56. It is hence to be appreciated that SB_ACCOUNT(N) in step 98 will either be the next indexed account record or it will be a first new account record. It is to be furthermore appreciated that any subsequent establishment of an account record in step 98 will include any remaining portion of a setback that continues in effect. This will occur even if the indexed setback accounts are cleared in step 118 as a result of also having received a request to initialize the setback usage.

It is to be appreciated that a preferred embodiment of a program for tracking and reporting setback usage has been disclosed. Alternations and modifications to the thus disclosed program may occur without departing from the scope of the invention. In particular, the processor may, for instance, receive different setpoint offsets for heating and cooling. In this event, the adjustments to the current heating and cooling setpoints would be with respect to the particularly computed offsets for each setpoint rather than the currently disclosed single SB_SETPOINTOFFSET. It is also to be appreciated that the approach to adjusting current heating and cooling setpoints by setpoint offsets need not occur to practice the invention. In this regard, setpoint offsets could be replaced by setpoints communicated by the energy provider. In this latter case, there would be no need for logic implementing adjustments to $T_h$ or $T_c$. It is furthermore to be appreciated that the SB_TIMER may be initially set up differently so as to not be a decrementing timer from a particular time "t". For instance, the timer may be incremented from zero at the initialization of a setback would work equally well.

Accordingly, the foregoing description of a preferred embodiment of the invention is by way of example only and the invention is to be limited by the following claims and equivalents thereto.

What is claimed is:

1. A process executable by a programmed processor within a thermostat for tracking and reporting the participation by the thermostat in requested setbacks of the setpoint control for the thermostat, said process comprising the steps of:

responding to a request to enter into a setback of at least one setpoint used in a normal mode of operation;

noting at least one temperature condition upon entry into the setback of at least one setpoint;

tracking the amount of time that elapses during the setback of at least one setpoint;

defining a setback record that includes the noted temperature condition and the elapsed time; and transmitting the setback record to a requesting entity in response to a request for information as to the participation of the thermostat in one or more requested setbacks of setpoints whereby the noted temperature condition at entry into setback and the elapsed time during setback is transmitted as a setback record to the requesting entity.

2. The process of claim 1 wherein said step of responding to a request for information as to the participation of the thermostat in one or more requested setbacks of setpoints further comprises:

noting a request for information as to the participation of the thermostat in one or more requested setbacks of setpoints during the implementation of a presently requested setback;

computing the amount of time that has elapsed during the presently requested setback in response to said step of noting that a request has been received during the implementation of the presently requested setback;

defining a setback record that includes the temperature condition at entry into the presently requested setback and the computed amount of time that has elapsed during the presently requested setback; and transmitting the defined setback record to the requesting entity as part of the response to the request for information as to the participation of the thermostat in one or more requested setbacks of setpoints.

3. The process of claim 1 further comprising the steps of:

monitoring any termination of a requested setback of a setpoint;

terminating the requested setback;

noting at least one temperature condition occurring at the time of terminating the requested setback;

including the temperature condition noted at the time of terminating the requested setback as part of the defined setback record whereby the defined setback record transmitted to the requesting entity includes at least one temperature condition occurring at the time of terminating the requested setback.

4. The process of claim 3 wherein said step of monitoring any termination of a requested setback of a setpoint comprises the step of:

monitoring a touch sensitive button on the thermostat so as to note when the touch sensitive button has been depressed thereby indicating that an override of the requested setback of the setpoint has occurred.

5. The process of claim 1 further comprising the step of:

responding to a request to initialize any setback records that may have been defined as to noted temperature conditions at entry into setbacks and the elapsed times during each setback participation whereby any such records are cleared from memory.

6. The process of claim 5 further comprising the steps of:

noting at least one temperature condition occurring during a setback of a setpoint that is continuing to occur following the response to the request to initialize any records;

computing any remaining period of time that elapses in the setback;

defining a setback record that includes the noted temperature condition occurring during a setback of a setpoint that is continuing to occur following the response to the request to initialize any records and the computed remaining period of time that elapses in the setback; and transmitting the defined setback record to the requesting entity as part of any subsequent response to a request for information as to the participation of the thermostat in one or more requested setbacks of setpoints.

7. The process of claim 1 wherein said step of noting at least one temperature condition upon entry into the setback of at least one setpoint comprises the step of:

noting the setpoint that is established at time of entry into the setback.

8. The process of claim 7 wherein said step of noting at least one temperature condition upon entry into the setback of at least one setpoint further comprises the step of:

noting the current temperature being sensed by a sensor associated with the thermostat at time of entry into the setback.

9. The process of claim 3 wherein said step of noting at least one temperature condition occurring at the time of terminating the requested setback comprises the step of:

noting the setpoint at time of terminating the setback.

10. The process of claim 9 wherein said step of noting at least one temperature condition occurring at the time of terminating the requested setback further comprises the step of:

noting the current temperature being sensed by a sensor associated with the thermostat at time of terminating the setback.

11. The process of claim 1 further comprising the step of:

noting the operating mode of a heating, ventilating, and air conditioning system controlled by the thermostat upon entry into the setback of at least one setpoint and storing the noted operating mode in the setback record.

12. The process of claim 1 further comprising the step of:

noting the operating mode of a heating, ventilating, and air conditioning system controlled by the thermostat upon termination of the requested setback and storing the noted operating mode in the setback record.

13. A thermostat having the capability to track and report the participation by the thermostat in requested setbacks of the setpoint control for the thermostat, said thermostat comprising:

a memory for storing information;

a processor operative to receive at least one communication requesting that the thermostat enter into a setback of at least one setpoint used in a normal mode of operation, said processor being operative to note at least one temperature condition upon entry into the setback of the setpoint, said processor being furthermore operative to track the amount of time that elapses during the setback of the setpoint, said processor being still furthermore operative to store the noted temperature condition and elapsed time as a setback record in said memory, said processor being operative to respond to any communication requesting information as to the participation of the thermostat in one or more requested setbacks of setpoints whereby the stored setback record is transmitted to the requesting entity.

14. The thermostat of claim 13 wherein said processor is furthermore operative in response to a request for information as to the participation of the thermostat in one or more requested setbacks to note whether the request for information as to the participation of the thermostat in one or more requested setbacks of setpoints is occurring during a presently implemented setback, said processor being operative to compute the amount of time that has elapsed during any such presently requested setback, said processor being operative to define a setback record that includes the temperature condition at entry into the presently requested setback and the computed amount of time that has elapsed and transmitting the defined setback record to the requesting entity as part of the response to the request for information as to the participation of the thermostat in one or more requested setbacks of setpoints.

15. The thermostat of claim 13 wherein said processor is furthermore operative when tracking the amount of time that elapses during the setback mode of operation to monitor any termination of a requested setback of the setpoint and to note at least one temperature condition occurring at the time of terminating the requested setback, said processor being furthermore operative to include the noted temperature condition at the time of terminating the requested setback in the defined setback record transmitted to the requesting entity as part of the response to the request for information as to the participation of the thermostat in one or more requested setbacks of setpoints.

16. The thermostat of claim 15 wherein said thermostat furthermore comprises at least one touch sensitive button which is depressed when a requested setback of a setpoint is to be terminated and wherein said processor is operative to store an indication that such touch sensitive button has been depressed in memory as an indication that a requested setback is to be terminated.

17. The thermostat of claim 15 wherein said processor is operative to note the setpoint at time of terminating the setback, the noted setpoint being a temperature condition occurring at the time of terminating the requested setback.

18. The thermostat of claim 17 wherein said processor is operative to note the current temperature being sensed by a sensor associated with the thermostat at time of terminating the setback, the noted current temperature being a temperature condition occurring at the time of terminating the requested setback.

19. The thermostat of claim 13 wherein said processor is operative to note the current temperature being sensed by a sensor associated with the thermostat at time of entry into the setback, the sensed temperature being a temperature condition noted upon entry into the setback of at least one setpoint.

20. The thermostat of claim 19 wherein said processor is operative to note the current temperature being sensed by a sensor associated with the thermostat at time of entry into the setback, the sensed temperature being a temperature condition noted upon entry into the setback of at least one setpoint.

21. The thermostat of claim 13 wherein said processor is furthermore operative to respond to a request to initialize any setback records that may have been defined as to the noted temperature conditions at entry into each setback and the elapsed times during each setback participation whereby any such setback records are cleared from memory.

22. The thermostat of claim 21 wherein said processor is furthermore operative to note at least one temperature condition occurring during a setback of a setpoint that is continuing to occur following the response to the request to initialize any records, said processor being operative to thereafter compute any remaining period of time that elapses in the setback, said processor being furthermore operative to define a setback record that includes the noted temperature condition occurring during the setback of a setpoint that is continuing to occur following the response to the request to initialize any records, said processor being operative to transmit the defined setback record to the requesting entity as part of any subsequent response to a request for information as to the participation of the thermostat in one or more requested setbacks of setpoints.

23. The thermostat of claim 13 wherein said processor is operative to note the operating mode of a heating, ventilating, and air conditioning system controlled by the thermostat upon entry into the setback of at least one setpoint and wherein said processor is furthermore operative to store the noted operating mode in the setback record.

24. The thermostat of claim 13 wherein said processor is operative to note the operating mode of a heating, ventilating, and air conditioning system controlled by the thermostat upon termination of the setback request and wherein said processor is furthermore operative to store the noted operating mode in the setback record.

\* \* \* \* \*